United States Patent
Golgiri et al.

(10) Patent No.: US 12,442,657 B2
(45) Date of Patent: Oct. 14, 2025

(54) VEHICLE PATH DETERMINATION

(71) Applicant: Ford Global Technologies, LLC, Dearborn, MI (US)

(72) Inventors: Hamid M. Golgiri, Livonia, MI (US); Chenhao Ma, Canton, MI (US); Tony Tae-Jin Pak, Garden City, MI (US); Arnav Sharma, Canton, MI (US); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 772 days.

(21) Appl. No.: 17/115,890

(22) Filed: Dec. 9, 2020

(65) Prior Publication Data

US 2022/0178715 A1 Jun. 9, 2022

(51) Int. Cl.
*G01C 21/00* (2006.01)
(52) U.S. Cl.
CPC ...... *G01C 21/3811* (2020.08); *G01C 21/3885* (2020.08)
(58) Field of Classification Search
CPC combination set(s) only.
See application file for complete search history.

(56) References Cited

U.S. PATENT DOCUMENTS

| | | | |
|---|---|---|---|
| 9,251,631 B2 | 2/2016 | Thompson et al. | |
| 10,514,697 B2 | 12/2019 | Wisniowski et al. | |
| 2014/0278101 A1* | 9/2014 | Davidson | G01C 21/32 701/533 |
| 2018/0150764 A1 | 5/2018 | Stenneth | |
| 2018/0215374 A1* | 8/2018 | Lee | G08G 1/147 |
| 2020/0353914 A1* | 11/2020 | Hasejima | B60W 40/105 |

FOREIGN PATENT DOCUMENTS

| | | |
|---|---|---|
| DE | 102016222049 A1 | 5/2018 |
| WO | 2019224161 A1 | 11/2019 |

* cited by examiner

*Primary Examiner* — Vivek D Koppikar
*Assistant Examiner* — Jeffrey R Chalhoub
(74) *Attorney, Agent, or Firm* — Frank A. MacKenzie; Brooks Kushman P.C.

(57) ABSTRACT

A vehicle is determined to be in a parking area based on vehicle sensor data. A mapping operation mode is activated based on determining the vehicle is in the parking area. A travel path of the vehicle through the parking area is recorded based on receiving a user input selecting the mapping operation mode. A map of the parking area is updated based on the recorded travel path.

18 Claims, 7 Drawing Sheets

VEHICLE PATH DETERMINATION

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
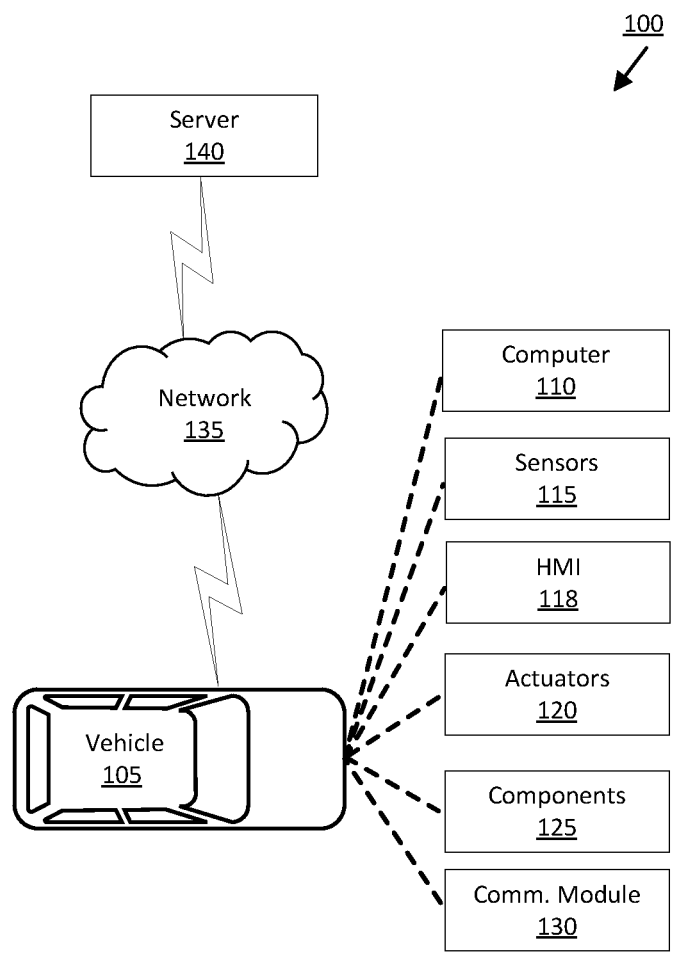
FIG. 1 is a block diagram illustrating an example vehicle control system for a vehicle.

A system includes a computer including a processor and a memory, the memory storing instructions executable by the processor to determine a vehicle is in a parking area based on vehicle sensor data. The instructions further include instructions to activate a mapping operation mode based on determining the vehicle is in the parking area. The instructions further include instructions to then record a travel path of the vehicle through the parking area based on receiving a user input selecting the mapping operation mode. The instructions further include instructions to update a map of the parking area based on the recorded travel path.

The instructions can further include instructions to determine that the vehicle is in the parking area based additionally on map data.

The instructions can further include instructions to input the sensor data into a machine learning program that outputs an identification of the parking area.

The instructions can further include instructions to deactivate the mapping operation mode based on determining the vehicle is in a road area.

The instructions can further include instructions to, upon determining a portion of the recorded travel path is outside the parking area, remove the portion of the travel path from the map.

The instructions can further include instructions to operate the vehicle in the parking area based on the updated map.

The instructions can further include instructions to determine a confidence estimate based on identifying an object in the sensor data and determine that the vehicle is in the parking area based additionally on the confidence estimate.

The instructions can further include instructions to determine that the vehicle is in the parking area based on the confidence estimate being greater than a first threshold, and to determine that the vehicle is in a road area based on the confidence estimate being less than a second threshold, the second threshold is less than the first threshold.

The instructions can further include instructions to, upon determining the confidence estimate is between the first and second threshold, determine that the vehicle is in the parking area or in the road area based on second sensor data.

The instructions can further include instructions to stop recording the travel path based on receiving a second user input deselecting the mapping operation mode.

The instructions can further include instructions to stop recording the travel path based on determining the vehicle is outside the parking area for a predetermined time.

The instructions can further include instructions to stop recording the travel path based on determining the vehicle is outside the parking area and a distance between the vehicle and the parking area is greater than a threshold.

The instructions can further include instructions to, upon determining, from the sensor data, that the vehicle is in an unknown area, determine that the vehicle is in the parking area based on second sensor data obtained after the vehicle moves a threshold distance.

The instructions can further include instructions to deactivate the mapping operation mode based on determining, from the second sensor data, that the vehicle is in the unknown area.

A method includes determining a vehicle is in a parking area based on vehicle sensor data. The method further includes activating a mapping operation mode based on determining the vehicle is in the parking area. The method further includes then recording a travel path of the vehicle through the parking area based on receiving a user input selecting the mapping operation mode. The method further includes updating a map of the parking area based on the recorded travel path.

The method can further include determining the vehicle is in the parking area based additionally on map data.

The method can further include inputting the sensor data into a machine learning program that outputs an identification of the parking area.

The method can further include deactivating the mapping operation mode based on determining the vehicle is in a road area.

The method can further include, upon determining a portion of the recorded travel path is outside the parking area, removing the portion of the travel path from the map.

The method can further include operating the vehicle in the parking area based on the updated map.

Further disclosed herein is a computing device programmed to execute any of the above method steps. Yet further disclosed herein is a computer program product, including a computer readable medium storing instructions executable by a computer processor, to execute an of the above method steps.

A vehicle computer can operate a vehicle along a stored travel path in a parking area that includes a plurality of sub-areas, i.e., parking spaces. While operating along the stored travel path, the vehicle computer can search for available sub-areas, e.g., unoccupied parking spaces, via image data. The vehicle computer can determine the stored travel path by recording a travel path along which a user previously operated the vehicle. The vehicle computer can initiate recording of the travel path based on receiving a user input. However, when the vehicle is operating in a road area, the vehicle computer may initiate recording of the travel path, which is desirable for the parking area, not the road area, based on receiving a user input. Advantageously, upon determining that the vehicle is in a parking area based on sensor data, the vehicle computer can activate a mapping operation mode that allows the vehicle computer to initiate recording of the travel path based on receiving a user input. Activating the mapping operation mode when the vehicle is in the parking area can prevent undesired recordings of travel paths in road areas thereby improving vehicle operation in parking areas.

With reference to FIGS. 1-2, an example vehicle control system 100 includes a vehicle 105. A vehicle computer 110 in the vehicle 105 receives data from sensors 115. The vehicle computer 110 is programmed to determine that the vehicle 105 is in a parking area 200 based on vehicle sensor 115 data. The vehicle computer 110 is further programmed to activate a mapping operation mode based on determining the vehicle 105 is in the parking area 200. The vehicle computer 110 is further programmed to then record a travel path P of the vehicle 105 through the parking area 200 based on receiving a user input selecting the mapping operation mode. The vehicle computer 110 is further programmed to update a map of the parking area 200 based on the recorded travel path P.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105.

As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation more, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2A:
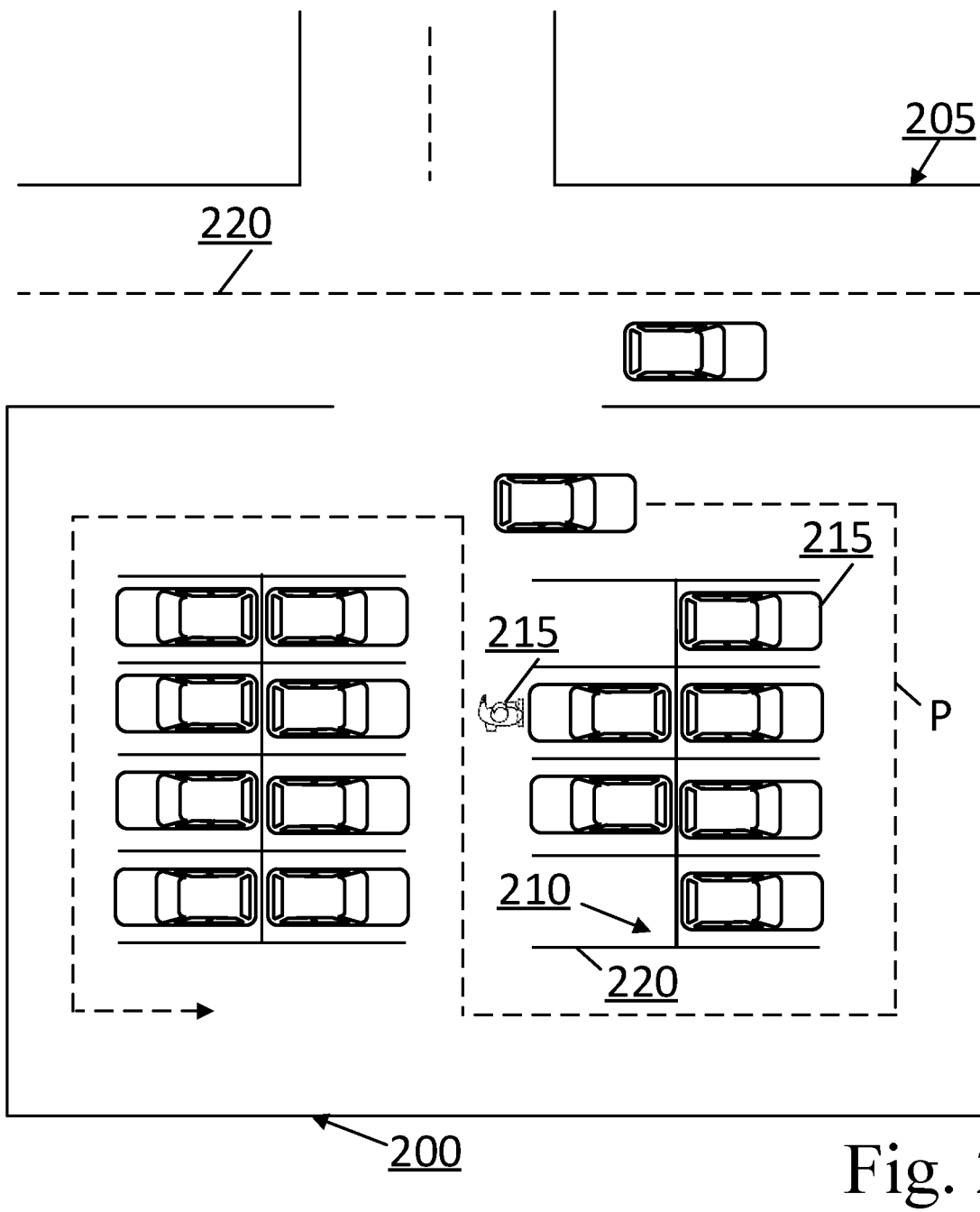
FIG. 2A is a diagram illustrating determining an example travel path according to the system of FIG. 1.
Figure 2B:
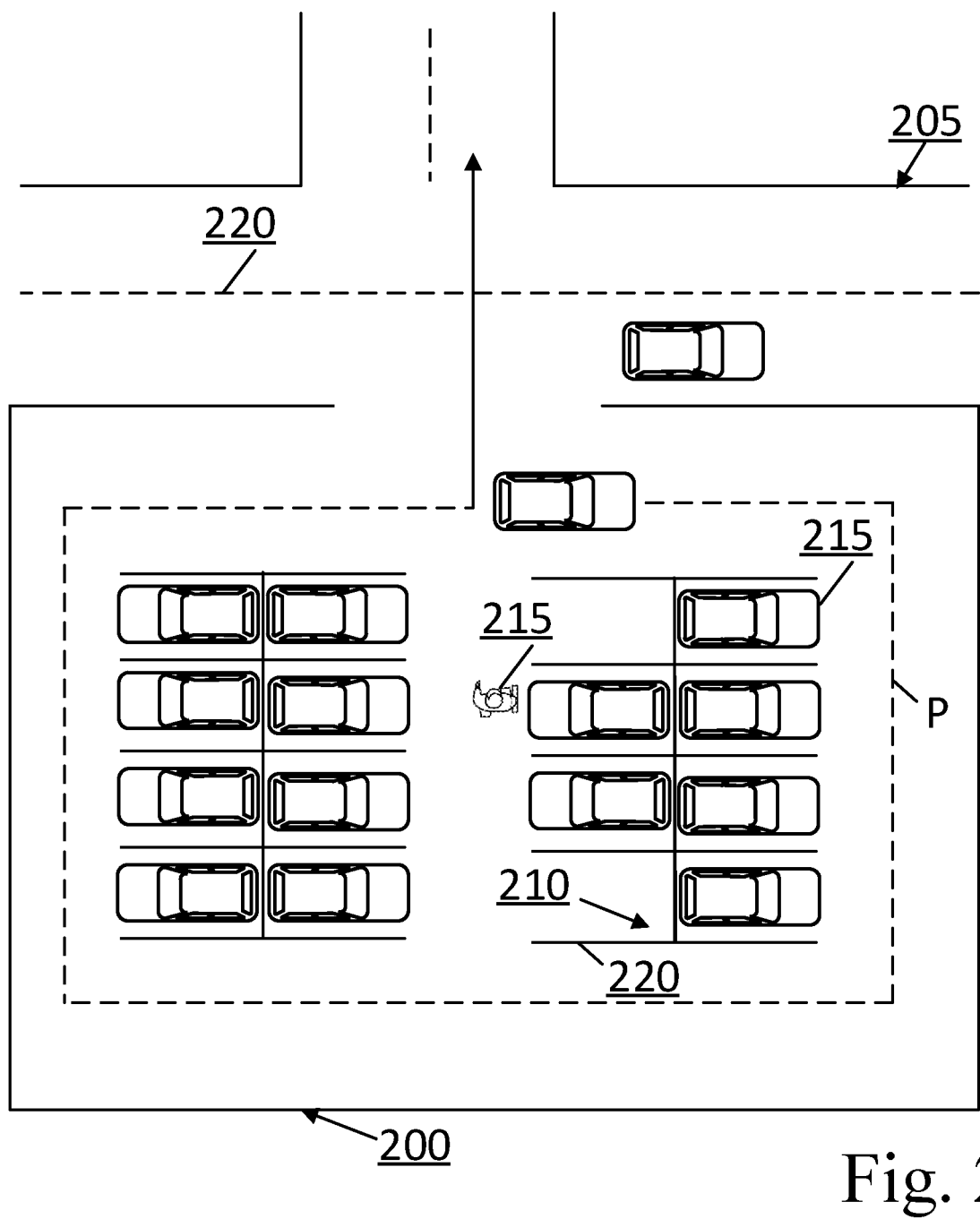
FIG. 2B is a diagram illustrating determining an example travel path including an invalid portion according to the system of FIG. 1.

FIGS. 2A and 2B are diagrams illustrating a vehicle 105 operating in an example parking area 200 that includes marked sub-areas 210 (e.g., parking spaces) for vehicles. The vehicle computer 110 is programmed to determine whether the vehicle 105 is in a road area 205 or a parking area 200. A road area 205 is an area of ground surface that includes any paved or finished surface provided for land vehicle travel. A parking area 200 is a specified area of ground surface for parking a vehicle. The parking area 200 may be on a street or road, e.g., an area alongside a curb or an edge of the street, a parking lot or structure or portion thereof, etc. A sub-area 210 may, for example, be a parking space indicated by conventional markings, e.g., painted lines on a ground surface, and conventional image recognition techniques can be employed by the vehicle computer 110 to identify the sub-area 210.

The vehicle computer 110 may be programmed to determine that the vehicle 105 is within the parking area 200 or the road area 205 based on sensor 115 data. For example, the vehicle computer 110 may be programmed to determine that the vehicle 105 is within the parking area 200 or road area 205 by, e.g., GPS-based geo-fencing. A geo-fence herein has the conventional meaning of a boundary for an area defined by sets of geo-coordinates. In such an example, one geo-fence specifies a perimeter of the parking area 200 and another geo-fence specifies a perimeter of the road area 205. The vehicle computer 110 can then determine that the vehicle 105 is within the parking area 200 or the road area 205 based on the location data of the vehicle 105 indicating the vehicle 105 is within the corresponding geo-fence. As another example, the vehicle computer 110 may determine whether the vehicle 105 is in the road area 205 or the parking area 200 based on data, e.g., map data, received from the remote server computer 140. For example, the vehicle computer 110 may receive a location of the vehicle 105, e.g., from a sensor 115, a navigation system, a remote server computer 140, etc. The vehicle computer 110 can compare the location of the vehicle 105 to the map data, e.g., to determine whether the vehicle 105 is in the road area 205 or the parking area 200 specified in the map data.

Additionally, or alternatively, the vehicle computer 110 may be programmed to determine that the vehicle 105 is in the parking area 200 or the road area 205 based on identifying objects 215 and/or markings 220, e.g., painted lines on a ground surface, in the environment around the vehicle 105. The vehicle computer 110 can receive sensor 115 data, e.g., image data, of the environment around the vehicle 105. The sensor 115 data, e.g., image data, can include one or more markings 220 around the vehicle 105. The markings 220 may, e.g., specify boundaries of a lane or parking space, specify a direction of travel, specify a type of vehicle authorized on the ground surface, etc. The vehicle computer 110 can identify the markings 220, e.g., by using suitable image recognition techniques.

Additionally, the sensor 115 data, e.g., image data, can include one or more objects 215 around the vehicle 105. The vehicle computer 110 can, for example, be programmed to classify and/or identify object(s) 215 based on sensor 115 data. For example, object classification or identification techniques can be used, e.g., in the vehicle computer 110 based on lidar sensor 115 data, camera sensor 115 data, etc., to identify a type of object 215, e.g., a vehicle, a pedestrian, a drone, etc., as well as physical features of objects. Non-limiting examples of objects 215 include a pedestrian, another vehicle, a bicycle, a shopping cart, a pole, etc.

Various techniques such as are known may be used to interpret sensor 115 data and/or to classify objects 215 based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects 215 or an indication that no object 215 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Additionally, or alternatively, the vehicle computer 110 may be programmed to determine that the vehicle 105 is in the parking area 200 or the road area 205 based on a speed of the vehicle 105 and/or a speed of various objects 215. The vehicle computer 110 can determine the speed of the vehicle 105 based on sensor 115 data. For example, a vehicle speed sensor can output a vehicle speed, i.e., a rate of movement of the vehicle, typically in a forward direction, with respect to a ground surface such as a road. For example, one or more conventional wheel speed sensors can be provided to detect a rate of rotation of vehicle wheels, from which a speed of the vehicle can be determined. As another example, a vehicle speed sensor can detect a rate of rotation of a crankshaft, from which the vehicle speed can be determined.

The vehicle computer can determine a speed of an object 215, e.g., a second vehicle, proximate the vehicle 105, i.e., within fields of view of the vehicle 105 sensors 115. The vehicle computer 110 may, for example, receive the speed of the object 215, e.g., via V2V or V2X communications. As another example, the vehicle computer 110 can determine the speed of the object 215 based on sensor 115 data. In such an example, the vehicle computer 110 can determine the speed of the object 215 relative to the vehicle 105 by determining a change in distance between the object 215 and the vehicle 105 over time. For example, the vehicle computer 110 can determine the speed of the object 215 relative to the vehicle 105 with the formula $\Delta D / \Delta T$, where $\Delta D$ is a difference between a pair of distances from the vehicle 105 to the object 215 taken at different times and $\Delta T$ is an amount of time between when the pair of distances was determined. For example, the difference between the pair of distances $\Delta D$ may be determined by subtracting the distance determined earlier in time from the distance determined later in time. In such an example, a positive value indicates that the object 215 is traveling slower than the vehicle 105, and a negative value indicates that the object 215 is traveling faster than the vehicle 105. The vehicle computer 110 can then combine, e.g., add, the speed of the vehicle 105 to the speed of the object 215 relative to the vehicle 105 to determine the speed of the object 215.

Upon detecting objects 215, markings 220, and/or speeds from the sensor 115 data, the vehicle computer 110 can then determine that the vehicle 105 is in a parking area 200 or a road area 205 based on a confidence estimate. A confidence estimate, as that term is used herein, is a numerical value that represents a likelihood that the vehicle 105 is in a parking area 200. As explained further below, the confidence estimate could be an integer or a real number.

A confidence score, as that term is used herein, is a numerical value, e.g., an integer, a percentage, etc., that represents a likelihood that the object 215, marking 220, and/or speed indicates the vehicle 105 is in a parking area 200 based on detecting from vehicle 105 sensor data that at least one criterion is satisfied. Examples of confidence scores and criteria from which respective confidence scored can be determined are provided in Table 1 below. Confidence scores are typically provided on a specified scale, and a confidence estimate determined from one or more confidence scores will likewise typically fall within that scale.

The vehicle computer 110 can determine the confidence estimate based on one or more confidence scores corresponding to each detected object 215, marking 220, and/or speed. For example, a confidence estimate could be determined to be a single confidence score where only one confidence score is available and/or the confidence score is above a threshold, i.e., deemed sufficiently high to be relied upon. For example, a highest possible confidence score could be assigned when a criterion of identifying a sign stating "parking area" is identified, and that confidence score could be used as a confidence estimate. In another example, a confidence estimate could be an average of determined confidence scores.

A confidence score can, for example, be an integer on a scale from −3 to 3, inclusive. In this example, a confidence score of 3 represents high confidence that the object 215, marking 220, and/or speed indicates the vehicle 105 is in a parking area 200, and a confidence score of −3 represents high confidence that the object 215, marking 220, and/or speed indicates the vehicle 105 is in a road area 205.

Additionally, a confidence score of 0 can represent that the object 215, marking 220, and/or speed indicates the vehicle 105 is in an unknown area 300. That is, a confidence score less than 0 can correspond to objects 215, markings 220, and/or speeds that indicate a road area 205, a confidence score greater than 0 can correspond to objects 215, markings 220, and/or speeds that indicate a parking area 200, and a confidence score of 0 can correspond to objects 215, markings 220, and/or speeds that are unknown or that indicate an unknown area 300.

To determine the confidence estimate, the vehicle computer 110 can access a look-up table, or the like, e.g., stored in a memory of the vehicle computer 110, that associates various objects 215, markings 220, and/or speeds with corresponding confidence scores. An example look-up table is set forth below in Table 1. The vehicle computer 110 can determine a confidence score for each detected object 215, marking 220, and/or speed based on the detected object 215, marking 220, and/or speed matching a stored object 215, marking 220, and/or speed in the look-up table. Upon determining a confidence score for one or more detected objects 215, markings 220, and/or vehicle 105 operating attributes, e.g., speed, the vehicle computer 110 can determine the confidence estimate by, for example, summing or averaging the confidence scores corresponding to each detected object 215, marking 220, and/or speed.

TABLE 1

| Confidence Score | Criterion |
|---|---|
| 3 | Detecting markings indicating rows of adjacent parking spaces in image data. |
| 2 | Detecting light posts between rows of stationary vehicles in image data. |
| 1 | Determine a speed of the vehicle 105 is 10 miles per hour. |
| 0 | Detecting an unknown sign in image data. |
| −1 | Determine a speed of another vehicle is 20 miles per hour. |
| −2 | Detecting signs indicating traffic control instructions, e.g., stop, yield, etc., in image data. |
| −3 | Detecting lane markings in image data. |

Upon determining the confidence estimate, the vehicle computer 110 can compare the confidence estimate to a first threshold. The first threshold specifies a confidence estimate above which the vehicle computer 110 determines that the vehicle 105 is in a parking area 200. The first threshold may be predetermined to correspond to the confidence score that represents high confidence that the vehicle 105 is in a parking area 200, e.g., 3. The first threshold may be stored, e.g., in a memory of the vehicle computer 110. The first threshold may be specified by a vehicle and/or component manufacturer. When the confidence estimate is greater than or equal to the first threshold, the vehicle computer 110 determines that the vehicle 105 is in a parking area 200.

Additionally, the vehicle computer 110 can compare the confidence estimate to a second threshold. The second threshold is a confidence estimate below which the vehicle computer 110 determines that the vehicle 105 is in a road area 205. The second threshold may be predetermined to correspond to the confidence score that represents high confidence that the vehicle 105 is in the road area 205, e.g., −3. The second threshold is less than the first threshold. The second threshold may be stored, e.g., in a memory of the vehicle computer 110. The second threshold may be specified by a vehicle and/or component manufacturer. When the confidence estimate is less than or equal to the second threshold, the vehicle computer 110 determines that the vehicle 105 is in a road area 205.

Additionally, or alternatively, the vehicle computer 110 can input image data of the environment around the vehicle 105 into a neural network, such as a deep neural network (DNN), that can be trained to accept image data as input and generate an output of a determination that the vehicle 105 is in a parking area 200 or in a road area 205.

Figure 3:
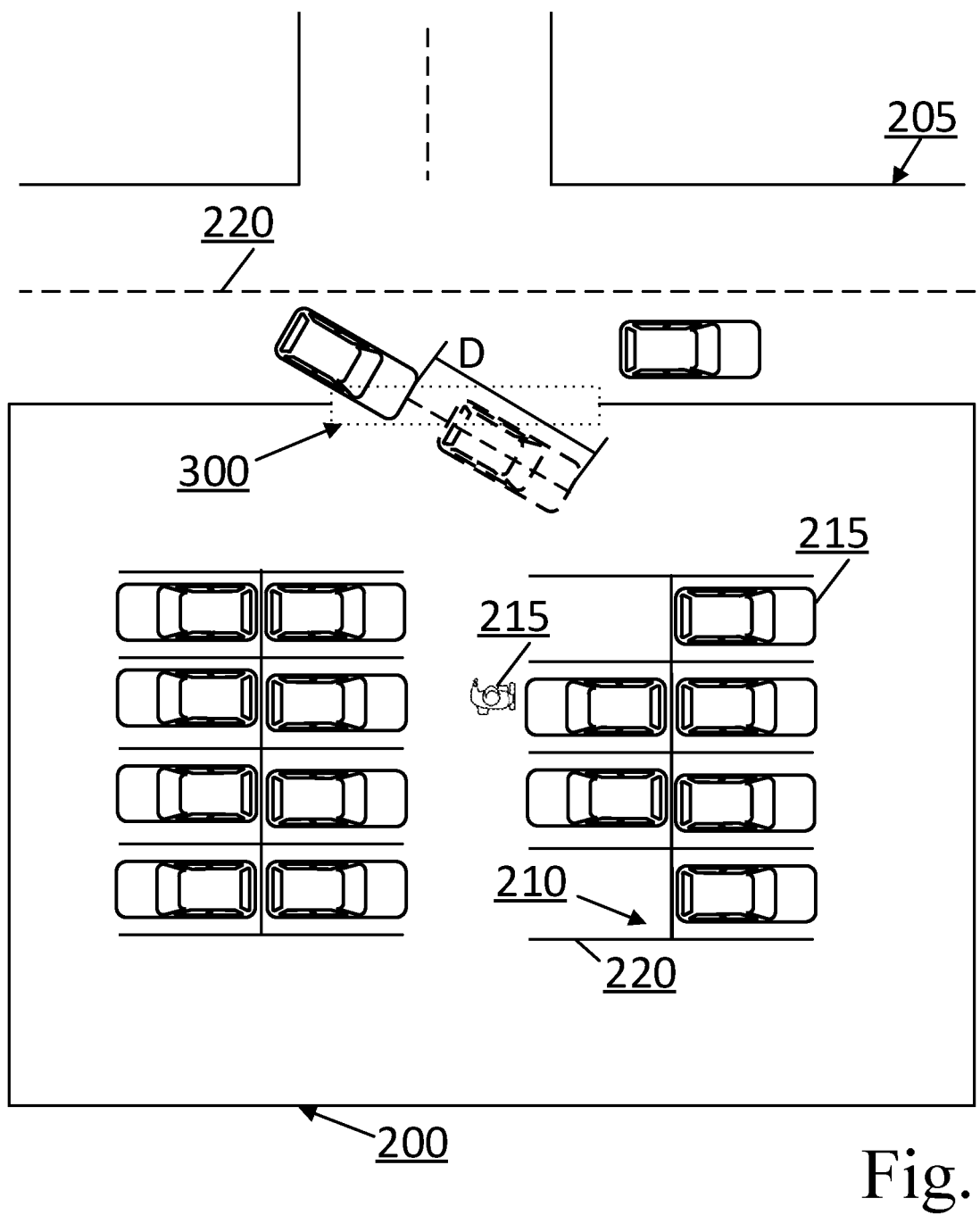
FIG. 3 is a diagram illustrating determining the vehicle is in an unknown area.

Turning now to FIG. 3, the vehicle computer 110 may be unable to determine whether the vehicle 105 is in a parking area 200 or a road area 205. For example, resolution limitations of map data may prevent the vehicle computer 110 from determining whether the vehicle 105 is in a parking area 200 or a road area 205. As another example, the vehicle computer 110 may be unable to determine whether the vehicle 105 is in a parking area 200 or a road area 205 when the confidence estimate is between the first threshold and the second threshold. If the vehicle computer 110 is unable to determine whether the vehicle 105 is in a parking area 200 or a road area 205, then the vehicle computer 110 may determine that the vehicle 105 is in an unknown area 300, e.g., an area including a boundary between a road area 205 and a parking area 200 (see in FIG. 3).

Upon determining the vehicle 105 is in an unknown area 300, the vehicle computer 110 may output a message, e.g., via the HMI 118, to the user indicating that the vehicle 105 is in an unknown area. Additionally, the message may instruct the user to operate the vehicle 105 a threshold distance D, e.g., 10 feet, 10 meters, etc. Alternatively, upon determining that the vehicle 105 is in the unknown area 300, the vehicle computer 110 may operate the vehicle 105 the threshold distance D. For example, the vehicle computer 110 may actuate one or more vehicle components 125 to move the vehicle 105 the threshold distance D. The threshold distance D may be determined empirically, e.g., based on determining a minimum distance a vehicle can move from a location that allows a vehicle computer to determine an updated vehicle location differs from the location based on obtained sensor data. The threshold distance D may be stored, e.g., in the memory of the vehicle computer 110.

While the vehicle 105 is moving the threshold distance D, the vehicle computer 110 can obtain second sensor 115 data. Second sensor 115 data in this context is data obtained from the sensors 115 after the vehicle computer 110 determines that the vehicle 105 is in an unknown area 300. The vehicle computer 110 can determine that the vehicle 105 has moved the threshold distance D based on sensor 115 data. For example, the vehicle computer 110 can count a number of wheel rotations detected by a wheel sensor 115 and can then determine a distance traveled based on a diameter of the wheel, e.g., stored in a memory of the vehicle computer 110. The vehicle computer 110 can then determine whether the vehicle 105 is in the road area 205 or the parking area 200 based on the second sensor 115, e.g., in substantially the same manner as discussed above regarding determining whether the vehicle 105 is in the road area 205 or the parking area 200 based on sensor data 115.

Returning to FIGS. 2A and 2B, the vehicle computer 110 is programmed to transition a mapping operation mode between a deactivated state and an activated state based on the location of the vehicle 105. For example, upon determining that the vehicle 105 has moved into a parking area 200, the vehicle computer 110 activates the mapping operation mode from the deactivated state to the activated state. As another example, upon determining that the vehicle 105 has moved into a road area 205, the vehicle computer 110 deactivates the mapping operation mode from the activated state to the deactivated state. That is, the mapping operation mode is activated when the vehicle 105 is in a parking area 200 and is deactivated when the vehicle 105 is in a road area 205.

Additionally, the vehicle computer 110 may deactivate the mapping operation mode based on determining, e.g., from sensor 115 data or second sensor 115 data, that the vehicle 105 is in an unknown area 300. For example, the vehicle computer 110 may prevent the mapping operation mode from transitioning to the activated state based on determining that the vehicle 105 is in an unknown area 300. As another example, upon determining that the vehicle 105 has moved into an unknown area 300, the vehicle computer 110 may deactivate the mapping operation mode.

The mapping operation mode records and stores, e.g., in a memory of the vehicle computer 110, a travel path P of the vehicle 105 through a parking area 200. Specifically, in the mapping operation mode, a user operates the vehicle 105 along a travel path P through the parking area 200, and the vehicle computer 110 is programmed to actuate one or more sensors 115 to record the travel path P of the vehicle 105. The vehicle computer 110 can then operate the vehicle 105 in the parking area 200 based on the stored travel path P, as discussed further below.

When the mapping operation mode is in the activated state, the vehicle computer 110 activates user selection of the mapping operation mode. For example, the vehicle computer 110 may actuate the HMI 118 to detect a first user input selecting the mapping operation mode. For example, the HMI 118 may be programmed to display a virtual button on a touchscreen display that the user can select to select the mapping operation mode. As another example, the HMI 118 may be programmed to provide a virtual button or the like that is non-selectable when the mapping operation mode is in the deactivated state, and selectable via the touchscreen display when the mapping operation mode is in the activated state. In other words, the HMI 118 may activate sensors 115 that can detect the user selecting the virtual button to select the mapping operation mode. Upon detecting the first user input, the HMI 118 can then provide the first user input to the vehicle computer 110, and the vehicle computer 110 can select the mapping operation mode based on the first user input.

When the mapping operation mode is in the deactivated state, the vehicle computer 110 may actuate the HMI 118 to deactivate detection of the first user input. Said differently, the vehicle computer 110 prevents the user from selecting the mapping operation mode, i.e., when the vehicle 105 is on a road area 205. For example, the HMI 118 may be programmed to remove a virtual button from the touchscreen display. As another example, the HMI 118 may be programmed to make the virtual button non-selectable. In other words, the HMI 118 may deactivate sensors 115 that can detect the user selecting the virtual button to select the mapping operation mode.

When the mapping operation mode is selected, the vehicle computer 110 can output a message, e.g., via the HMI 118, instructing the user to operate the vehicle 105 along a travel path P through the parking area 200. While the user operates the vehicle 105, the vehicle computer 110 records the travel path P. For example, the vehicle computer 110 can receive location data for the vehicle 105 at predetermined time intervals, e.g., every 500 milliseconds, every 1 second, 5 seconds, etc. The vehicle computer 110 can generate the travel path P based on such temporally successive vehicle 105 locations. For example, the vehicle computer 110 can determine geo-coordinates specified by the location data of the vehicle 105 after each time interval. The vehicle computer 110 can then store the determined geo-coordinates, e.g., in a memory of the vehicle computer 110. Additionally, the vehicle computer 110 can store, e.g., in the memory, the time intervals, i.e., a timestamp, associated with determined geo-coordinates.

While the user is operating the vehicle 105 in the mapping operation mode, the vehicle computer 110 can monitor the location of vehicle 105. For example, the vehicle computer 110 can determine a distance between the vehicle 105 and the geo-fence of the parking area 200. For example, the vehicle computer 110 can determine the distance based on map data, e.g., by determining a distance from GPS coordinates of the vehicle 105 location to a closest point on the geo-fence of the parking area 200 at which the travel path P intersects the geo-fence.

While the vehicle 105 is within the parking area 200, the vehicle computer 110 can compare the distance to a first distance threshold. The first distance threshold specifies a minimum distance between the vehicle 105 and the geo-fence, i.e., perimeter, of the parking area 200 within which the vehicle computer 110 outputs a message to the user. The first distance threshold can be determined empirically, e.g., based on determining a distance from the geo-fence of a parking area within which vehicles cannot turn around and remain within the parking area. The first distance threshold may be stored, e.g., in a memory of the vehicle computer 110. If the distance is greater than the first distance threshold, then the vehicle computer 110 can maintain the mapping operation mode in the activated state. If the distance is less than or equal the first distance threshold, then the vehicle computer 110 can output a message, e.g., via the HMI 118, alerting the user that the vehicle 105 is departing the parking area 200.

The vehicle computer 110 may be programmed to stop recording the travel path P upon detecting a second user input. For example, the vehicle computer 110 may actuate the HMI 118 to detect the second user input deselecting the mapping operation mode. For example, the HMI 118 may be programmed to display a virtual button on a touchscreen display that the user can select to deselect the mapping operation mode. As another example, the HMI 118 may be programmed to provide a virtual button or the like that is non-selectable when the mapping operation mode is in the deactivated state, and selectable via the touchscreen display when the mapping operation mode is in the activated state. In other words, the HMI 118 may activate sensors 115 that can detect the user selecting the virtual button to deselect the mapping operation mode. Upon detecting the second user input, the HMI 118 can then provide the second user input to the vehicle computer 110, and the vehicle computer 110 can deselect the mapping operation mode and stop recording the travel path P based on the second user input.

Additionally, or alternatively, the vehicle computer 110 may be programmed to stop recording the travel path P upon detecting that the vehicle 105 is outside the parking area 200. As discussed above, the vehicle computer 110 can compare location data of the vehicle 105 to a geo-fence of the parking area 200. As one example, upon determining that the vehicle 105 is outside of the geo-fence of the parking area 200, the vehicle computer 110 can stop recording the travel path P. Additionally, the vehicle computer 110 can output a message, e.g., via the HMI 118, to the user specifying that the vehicle 105 departed the parking area 200 and the vehicle computer 110 stopped recording the travel path P.

As another example, upon determining that the vehicle 105 is outside of the geo-fence of the parking area 200, the vehicle computer 110 can determine an amount of time that the vehicle 105 remains outside the parking area 200. For example, upon determining the vehicle 105 departed the parking area 200, the vehicle computer 110 can initiate a timer. The predetermined time period may be determined empirically, e.g., based on determining an amount of time for vehicles to return to a parking area while operating in a road area adjacent the parking area. If the vehicle 105 does not return to the parking area 200 prior to expiration of the timer, then the vehicle computer 110 can stop recording the travel path P and deactivate the mapping operation mode. If the vehicle 105 returns to the parking area 200 prior to expiration of the timer, then the vehicle computer 110 maintains the mapping operation mode in the activated state and resets the timer.

As another example, upon determining that the vehicle 105 is outside of the geo-fence of the parking area 200, the vehicle computer 110 can determine a distance between the vehicle 105 and the parking area 200. For example, the vehicle computer 110 can determine the distance based on map data, e.g., by determining a difference in GPS coordinates of the vehicle 105 location and a point on the geo-fence at which the travel path P intersects the geo-fence of the parking area 200. Upon determining the distance, the vehicle computer 110 can compare the distance to a second distance threshold. The second distance threshold specifies a maximum distance outside of the geo-fence that the vehicle computer 110 can operate in the mapping operation mode. The second distance threshold may be determined empirically, e.g., based on determining a distance outside of a parking area within which vehicles are likely to turn into the parking area. The second distance threshold may be stored, e.g., in a memory of the vehicle computer 110. If the distance is less than or equal to the second distance threshold, then the vehicle computer 110 can maintain the mapping operation mode in the activated state. If the distance is greater than the second distance threshold, then the vehicle computer 110 can stop recording the travel path P and deactivate the mapping operation mode.

Upon determining that the vehicle 105 is operating outside of the parking area 200, the vehicle computer 110 can identify a portion of the travel path P outside the parking area 200, i.e., from the geo-fence of the parking area 200 to the location of the vehicle 105, as invalid (shown as a solid line in FIG. 2B). That is, the vehicle computer 110 can determine valid portions of the travel path P are those within the parking area 200 (shown in broken lines in FIG. 2B). Additionally or alternatively, the vehicle computer 110 can identify portions of the travel path P that terminate at a point, e.g., at the geo-fence, i.e., perimeter, of the parking area 200, as invalid. That is, the vehicle computer 110 can determine valid portions of the travel path P are those which extend endlessly within the parking area 200. The vehicle computer 110 can remove invalid portions of the travel path P when the mapping operation mode is deactivated or deselected.

Upon determining the travel path P, including the valid portions thereof, the vehicle computer 110 can update the map to specify the recorded travel path P. The vehicle computer 110 can then operate the vehicle 105 through the parking area 200 based on the updated map. For example, the vehicle computer 110 can actuate one or more vehicle components 125 to move the vehicle 105 along the recorded travel path P in the parking area 200, e.g., to search for available sub-areas 210, to pick up a user at a specified location, etc. That is, the vehicle computer 110 can operate the vehicle 105 to follow the recorded travel path P, i.e., the valid portions, specified by the user during operation of the vehicle 105 in the mapping operation mode.

Figure 4:
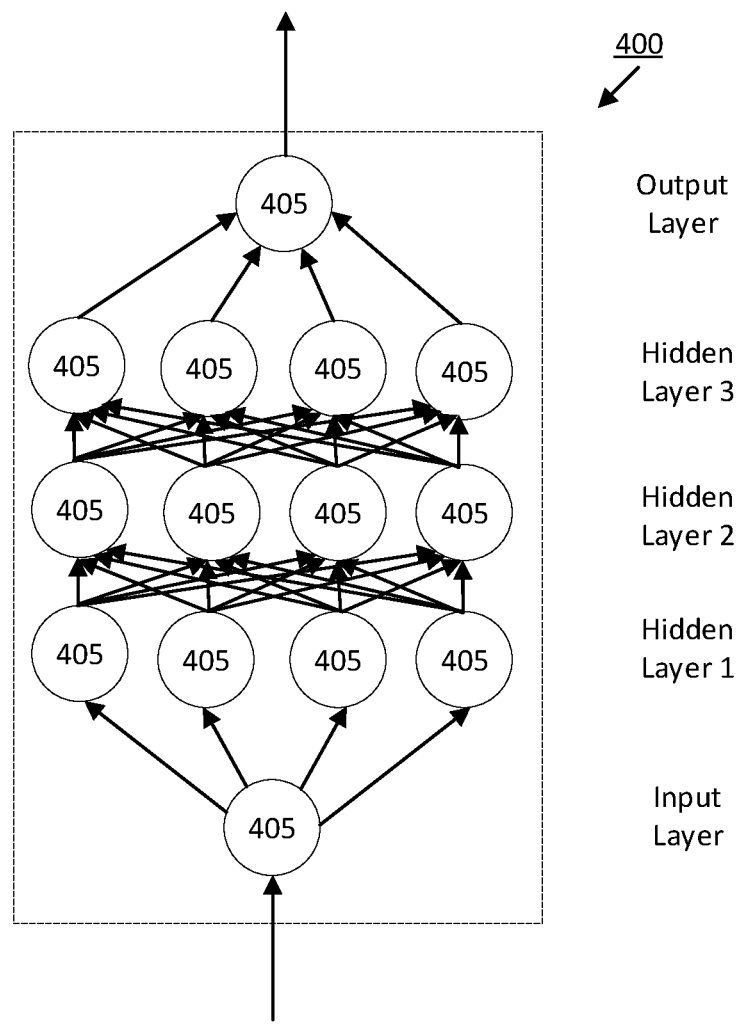
FIG. 4 is an example diagram of a deep neural network.

FIG. 4 is a diagram of an example deep neural network (DNN) 400 that can be trained to determine whether the vehicle 105 is in a parking area 200 or a road area 205 based on image data of the environment around the vehicle 105. The DNN 400 can be a software program that can be loaded in memory and executed by a processor included in a computer, for example. In an example implementation, the DNN 400 can include, but is not limited to, a convolutional neural network (CNN), R-CNN (Region-based CNN), Fast R-CNN, and Faster R-CNN. The DNN includes multiple nodes, and the nodes are arranged so that the DNN 400 includes an input layer, one or more hidden layers, and an output layer. Each layer of the DNN 400 can include a plurality of nodes 405. While FIG. 4 illustrate three hidden layers, it is understood that the DNN 400 can include additional or fewer hidden layers. The input and output layers may also include more than one node 405.

The nodes 405 are sometimes referred to as artificial neurons 405, because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to an activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

As one example, the DNN 400 can be trained with ground truth data, i.e., data about a real-world condition or state. For example, the DNN 400 can be trained with ground truth data and/or updated with additional data by a processor of the remote server computer 140. Weights can be initialized by using a Gaussian distribution, for example, and a bias for each node 405 can be set to zero. Training the DNN 400 can include updating weights and biases via suitable techniques such as back-propagation with optimizations. Ground truth data used for training can include, but is not limited to, data specifying objects, e.g., vehicles, signs, pedestrians, debris, etc., within an image. For example, the ground truth data may be data representing objects and object labels. In another example, the ground truth data may be data representing an object, e.g., a vehicle 105, and a relative angle and/or speed of the object, e.g., the vehicle 105, with respect to another object, e.g., a pedestrian, another vehicle, a sign etc.

During operation, the vehicle computer 110 obtains sensor 115 data of the environment around the vehicle 105 and provides the sensor 115 data, e.g., image data, vehicle 105 speed, another vehicle's speed, etc., to the DNN 400. The DNN 400 generates an output based on the received input. The output is a determination of whether the vehicle 105 is in a parking area 200 or in a road area 205 and a confidence estimate (as discussed above).

Figure 5A:
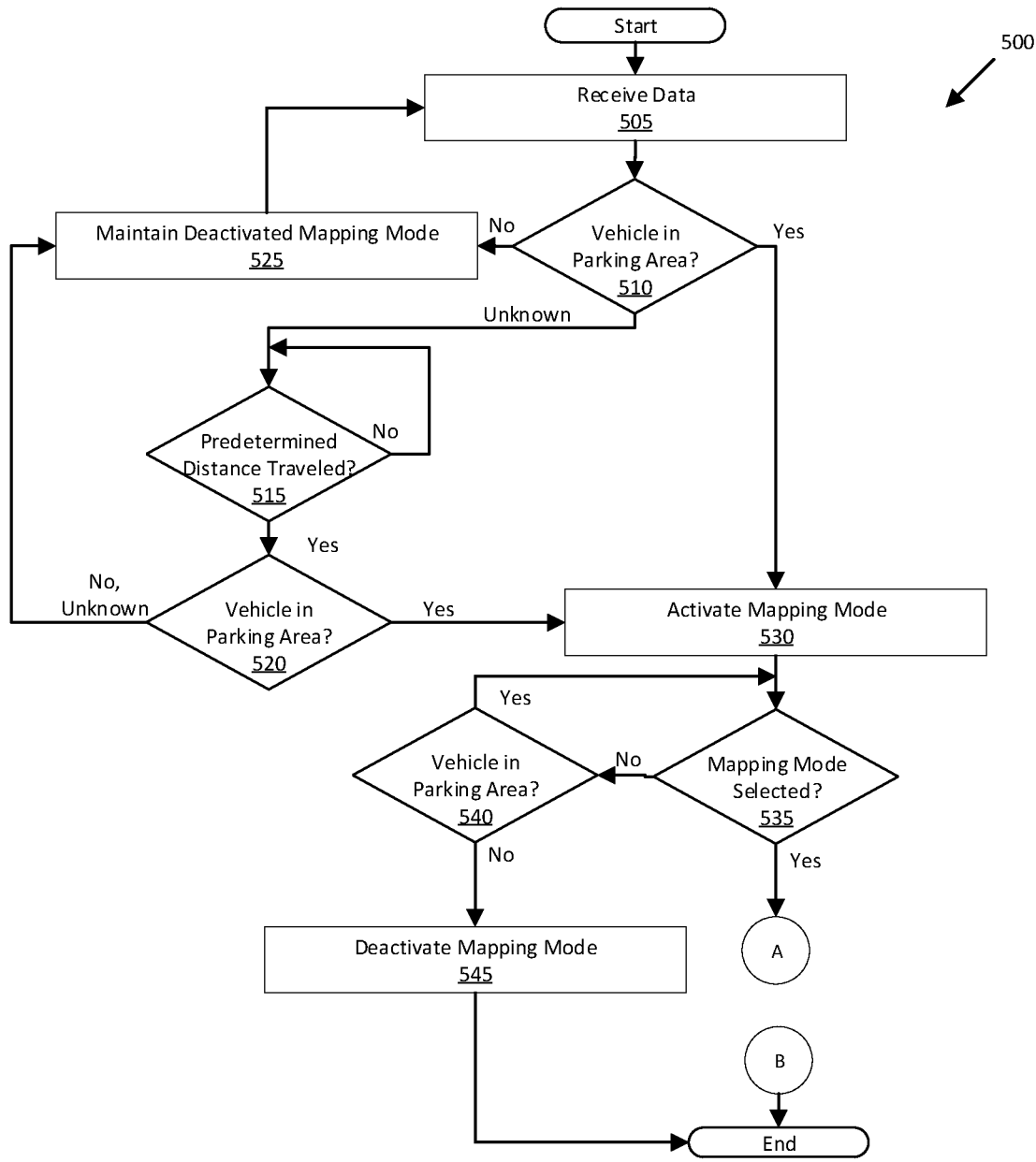
FIG. 5A is a first part of a flowchart of an example process for operating the vehicle.

FIG. 5A is a first portion of a flowchart of an example process 500 (the second portion being shown in FIG. 5B because the entire flowchart will not fit on a single drawing sheet) for operating a vehicle 105. The process 500 begins in a block 505. The process 500 can be carried out by a vehicle computer 110 included in the vehicle 105 executing program instructions stored in a memory thereof.

In the block 505, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive location data, e.g., geo-coordinates, of the vehicle 105, e.g., from a sensor 115, a navigation system, etc. Additionally, the vehicle computer 110 can receive image data, e.g., from one or more image sensors 115. The image data may include data about the environment around the vehicle 105, e.g., the parking area 200, a sub-area 210, one or more objects 215 and/or markings 220, etc. The process 500 continues in a block 510.

In the block 510, the vehicle computer 110 determines whether the vehicle 105 is in a parking area 200 or a road area 205 based on the received data, e.g., image data and/or location data. For example, the vehicle computer 110 can compare the location of the vehicle 105 to the location of the parking area 200 to determine whether the vehicle 105 is within a geo-fence of the parking area 200, as discussed above. As another example, the vehicle computer 110 can input image data to a DNN 400 that outputs a determination of whether the vehicle 105 is in a road area 205 or a parking area 200 and a confidence estimate, as discussed above. In an example in which the vehicle computer 110 is unable to determine whether the vehicle 105 is in a parking area 200 or a road area 205, the vehicle computer 110 can determine that the vehicle 105 is in an unknown area 300, as discussed above. If the vehicle computer 110 determines that the vehicle 105 is in the parking area 200, then the process 500 continues in a block 530. If the vehicle computer 110 determines that the vehicle 105 is not in a parking area 200, i.e., is in a road area 205, then the process 500 continues in a block 525. If the vehicle computer 110 determines that the vehicle 105 is in an unknown area 300, then the process 500 continues in a block 515.

In the block 515, the vehicle computer 110 determines whether the vehicle 105 has moved a threshold distance D. For example, upon determining that the vehicle 105 is in an unknown area 300, the vehicle computer 110 can actuate an HMI 118 to output a message to the user, as discussed above. The message can instruct the user to operate the vehicle 105 to move the threshold distance D. While the vehicle 105 is moving the threshold distance D, the vehicle computer 110 can obtain second sensor 115 data. The vehicle computer 110 can determine that the vehicle 105 has moved the threshold distance D based on the second sensor 115 data, as discussed above. If the vehicle 105 has moved the threshold distance D, then the process 500 continues in a block 520. Otherwise, the process 500 remains in the block 515.

In the block 520, the vehicle computer 110 determines whether the vehicle 105 is in a parking area 200 or a road area 205 based on the second sensor 115 data, e.g., second image data and/or second location data. The vehicle computer 110 can determine whether the vehicle 105 is in a parking area 200 or a road area 205 in substantially the same manner as discussed above regarding the block 510. If the vehicle computer 110 determines that the vehicle 105 is in a parking area 200, then the process 500 continues in the block 530. If the vehicle computer 110 determines that the vehicle 105 is in a road area 205 or is in an unknown area 300, then the process 500 continues in the block 525.

In the block 525, the vehicle computer 110 maintains a mapping operation mode in a deactivated state. For example, the vehicle computer 110 can maintain the mapping operation mode in the deactivated state upon determining that the vehicle 105 remains in a road area 205. As another example, the vehicle computer 110 can maintain the mapping operation mode in the deactivated state upon determining that the vehicle 105 is in an unknown area 300. In the deactivated state, the vehicle computer 110 prevents user selection of the mapping operation mode, as discussed above. Additionally, in the deactivated state, the vehicle computer 110 does not record a travel path P of the vehicle 105. The process 500 returns to the block 505.

In the block 530, the vehicle computer 110 activates the mapping operation mode. For example, upon determining that the vehicle 105 has moved from a road area 205 to a parking area 200, the vehicle computer 110 activates the mapping operation mode from the deactivated state to an activated state. Additionally, the vehicle computer 110 can maintain the mapping operation mode in the activated state upon determining that the vehicle 105 remains in the parking area 200. In the activated state, the vehicle computer 110 enables user selection of the mapping operation mode. The process 500 continues in a block 535.

In the block 535, the vehicle computer 110 determines whether the mapping mode is selected. For example, in the activated state, the vehicle computer 110 may actuate an HMI 118 to detect a first user input selecting the mapping operation mode, as discussed above. In other words, the HMI 118 may activate sensors 115 that can detect the first user input, e.g., the user selecting a virtual button on a touchscreen display to select the mapping operation mode. Upon detecting the first user input, the HMI 118 can then provide the first user input to the vehicle computer 110, and the vehicle computer 110 can select the mapping operation mode based on the first user input. If the vehicle computer 110 receives the first user input selecting the mapping operation mode, then the process 500 continues in a block 550. Otherwise, the process 500 continues in a block 540.

In the block 540, the vehicle computer 110 determines whether the vehicle 105 is in a parking area 200 or a road area 205 based on data, e.g., image data and/or location data. The vehicle computer 110 can determine whether the vehicle 105 is in a parking area 200 or a road area 205 in substantially the same manner as discussed above regarding the block 510. If the vehicle computer 110 determines that the vehicle 105 is in a parking area 200, then the process 500 returns to the block 535. Otherwise, the process 500 continues in the block 545.

In the block 545, the vehicle computer 110 deactivates the mapping operation mode. For example, upon determining that the vehicle 105 has moved from a parking area 200 to a road area 205, the vehicle computer 110 deactivates the mapping operation mode from the activated state to the deactivated state. In the deactivated state, the vehicle computer 110 does not record a travel path P of the vehicle 105. Additionally, the vehicle computer 110 may prevents user selection of the mapping operation mode, as discussed above. The process 500 ends following the block 545.

Figure 5B:
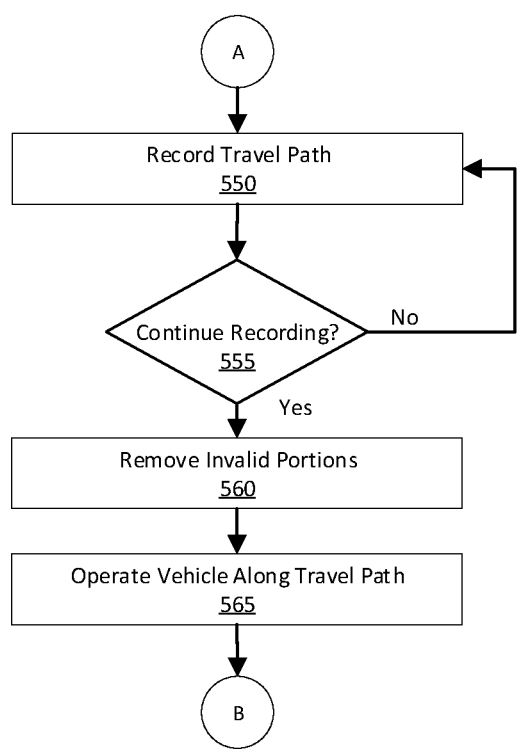
FIG. 5B is a second part of the flowchart of FIG. 5A.

Turning now to FIG. 5B, following the block 535 shown in FIG. 5A, in the block 550, the vehicle computer 110 records a travel path P of the vehicle 105. For example, upon detecting the first user input selecting the mapping operation mode, the vehicle computer 110 can actuate the HMI 118 to output a message instructing a user to operate the vehicle 105 through the parking area 200. While the user is operating the vehicle 105, the vehicle computer 110 can, for example, receive location data for the vehicle at predetermined time intervals, e.g., every 500 milliseconds, 1 second, 5 seconds, etc. The vehicle computer 110 can then generate the travel path P based on temporally successive vehicle 105 locations, as discussed above. The process 500 continues in a block 555.

In the block 555, the vehicle computer 110 determines whether to continue recording the travel path P. For example, the vehicle computer 110 can stop recording the travel path P based on receiving a second user input deselecting the mapping operation mode, e.g., via the HMI 118, as discussed above. If the vehicle computer 110 receives the second user input, then the vehicle computer 110 determines to stop recording the travel path P. If the vehicle computer 110 fails to receive the second user input, then the vehicle computer 110 determines to continue recording the travel path P.

Additionally or alternatively, the vehicle computer 110 can stop recording the travel path P based on detecting the vehicle 105 is outside the parking area 200. For example, the vehicle computer 110 can initiate a timer upon detecting the vehicle 105 is outside the parking area 200, as discussed above. If the vehicle 105 does not return to the parking area 200 prior to expiration of the timer, then the vehicle computer 110 can determine to stop recording the travel path P. If the vehicle 105 returns to the parking area 200 prior to expiration of the timer, then the vehicle computer 110 can determine to continue recording the travel path P. As another example, the vehicle computer 110 can determine a distance between the vehicle 105 and the parking area 200 upon determining that the vehicle 105 is outside the parking area 200, as discussed above. The vehicle computer 110 can then compare the distance to a second distance threshold. If the distance is greater than the second distance threshold, then the vehicle computer 110 can determine to stop recording the travel path P. If the distance is less than or equal to the second distance threshold, then the vehicle computer 110 can determine to continue recording the travel path P. If the vehicle computer 110 determines to stop recording the travel path P, then the process 500 continues in a block 560. Otherwise, the process 500 returns to the block 550.

In the block 560, the vehicle removes invalid portions from the travel path P. For example, the vehicle computer 110 can identify a portion of the travel path P that is outside the parking area 200 as invalid, as discussed above. The vehicle computer 110 then removes the invalid portions from the travel path P. That is, the vehicle computer 110 maintains valid portions, i.e., portions within the parking area 200, of the travel path P, as discussed above. The vehicle computer 110 can then update a map of the parking area 200 to specify the travel path P, and specifically, the valid portions. The vehicle computer 110 can store the map, e.g., in a memory of the vehicle computer 110. The process 500 continues in a block 565.

In the block 565, the vehicle computer 110 can operate the vehicle 105 through the parking area 200 based on updated map. For example, the vehicle computer 110 can actuate one or more vehicle components 125 to move the vehicle 105 along the stored travel path P specified in the updated map. The process 500 ends following the block 565.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   determine a vehicle is in a parking area that includes a plurality of sub-areas based on vehicle sensor data;
   activate a mapping operation mode based on determining the vehicle is in the parking area;
   then record a travel path of the vehicle through the parking area based on receiving a user input selecting the mapping operation mode;
   update a map of the parking area based on the recorded travel path; and
   operate the vehicle based on the map by actuating a vehicle component.

2. The system of claim 1, wherein the instructions further include instructions to determine that the vehicle is in the parking area based additionally on map data.

3. The system of claim 1, wherein the instructions further include instructions to input the sensor data into a machine learning program that outputs an identification of the parking area.

4. The system of claim 1, wherein the instructions further include instructions to deactivate the mapping operation mode based on determining the vehicle is in a road area.

5. The system of claim 1, wherein the instructions further include instructions to, upon determining a portion of the recorded travel path is outside the parking area, remove the portion of the travel path from the map.

6. The system of claim 1, wherein the instructions further include instructions to determine a confidence estimate based on identifying an object in the sensor data, and determine that the vehicle is in the parking area based additionally on the confidence estimate.

7. The system of claim 6, wherein the instructions further include instructions to determine that the vehicle is in the parking area based on the confidence estimate being greater than a first threshold, and to determine that the vehicle is in a road area based on the confidence estimate being less than a second threshold, the second threshold is less than the first threshold.

8. The system of claim 7, wherein the instructions further include instructions to, upon determining the confidence estimate is between the first and second threshold, determine that the vehicle is in the parking area or in the road area based on second sensor data.

9. The system of claim 1, wherein the instructions further include instructions to stop recording the travel path based on receiving a second user input deselecting the mapping operation mode.

10. The system of claim 1, wherein the instructions further include instructions to stop recording the travel path based on determining the vehicle is outside the parking area for a predetermined time.

11. The system of claim 1, wherein the instructions further include instructions to stop recording the travel path based on determining the vehicle is outside the parking area and a distance between the vehicle and the parking area is greater than a threshold.

12. The system of claim 1, wherein the instructions further include instructions to, upon determining, from the sensor data, that the vehicle is in an unknown area, determine that the vehicle is in the parking area based on second sensor data obtained after the vehicle moves a threshold distance.

13. The system of claim 12, wherein the instructions further include instructions to deactivate the mapping operation mode based on determining, from the second sensor data, that the vehicle is in the unknown area.

14. A method, comprising:
   determining a vehicle is in a parking area that includes a plurality of sub-areas based on vehicle sensor data;
   activating a mapping operation mode based on determining the vehicle is in the parking area;
   then recording a travel path of the vehicle through the parking area based on receiving a user input selecting the mapping operation mode;
   updating a map of the parking area based on the recorded travel path; and
   operating the vehicle based on the map by actuating a vehicle component.

15. The method of claim 14, further comprising determining the vehicle is in the parking area based additionally on map data.

16. The method of claim 14, further comprising inputting the sensor data into a machine learning program that outputs an identification of the parking area.

17. The method of claim 14, further comprising deactivating the mapping operation mode based on determining the vehicle is in a road area.

18. The method of claim 14, further comprising, upon determining a portion of the recorded travel path is outside the parking area, removing the portion of the travel path from the map.

\* \* \* \* \*